(12) United States Patent
Shutter (10) Patent No.: US 8,335,524 B2
(45) Date of Patent: Dec. 18, 2012

(54) METHOD AND SYSTEM FOR PROVIDING LOCATION TARGETED ADVERTISEMENTS

(75) Inventor: Jon Shutter, Chicago, IL (US)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/097,413

(22) Filed: Apr. 29, 2011

(65) Prior Publication Data

US 2012/0276928 A1    Nov. 1, 2012

(51) Int. Cl.
*H04W 24/00* (2009.01)
*G06Q 30/00* (2012.01)

(52) U.S. Cl. ............. 455/456.3; 705/14.64; 705/14
(58) Field of Classification Search .......... 455/456, 455/456.3; 705/14, 26; 342/357.09
See application file for complete search history.

(56) References Cited

U.S. PATENT DOCUMENTS

| | | | |
|---|---|---|---|
| 5,948,061 A | 9/1999 | Merriman et al. | 709/219 |
| 6,414,635 B1 | 7/2002 | Stewart et al. | 342/457 |
| 6,526,350 B2 | 2/2003 | Sekiyama | 701/209 |
| 6,542,822 B1 | 4/2003 | Froeberg | 701/213 |
| 6,795,710 B1 | 9/2004 | Creemer | 455/456.3 |
| 6,847,969 B1 | 1/2005 | Mathai et al. | 707/100 |
| 7,089,264 B1 | 8/2006 | Guido et al. | 707/104.1 |
| 2002/0023010 A1* | 2/2002 | Rittmaster et al. | 705/26 |
| 2002/0032035 A1* | 3/2002 | Teshima | 455/456 |
| 2004/0073482 A1* | 4/2004 | Wiggins et al. | 705/14 |
| 2004/0209601 A1 | 10/2004 | Obradovich et al. | 455/414.1 |

FOREIGN PATENT DOCUMENTS

| | | |
|---|---|---|
| EP | 1191467 | 3/2002 |
| WO | WO97/17685 | 5/1997 |
| WO | WO01/65455 | 9/2001 |

OTHER PUBLICATIONS

European Search Report issued in related European Patent Application EP12 16 0611 dated Jul. 2, 2012.

* cited by examiner

*Primary Examiner* — Kent Chang
*Assistant Examiner* — Kuo Woo (57) ABSTRACT

A method of providing advertisements to mobile devices located in a geographic region is disclosed. Current weather condition information and data representing an advertisement are obtained. A size of an advertisement area for the advertisement based on the current weather information is determined. The size of the advertisement area is decreased during a poor weather condition. A position of a first mobile device is obtained and if the position of the first mobile device is located in the advertisement area, the advertisement is provided to the first mobile device.

15 Claims, 7 Drawing Sheets

METHOD AND SYSTEM FOR PROVIDING LOCATION TARGETED ADVERTISEMENTS

BACKGROUND OF THE INVENTION

The present invention relates to a method and system for providing advertisements, and more particularly to a method and system for providing location targeted advertisements to mobile devices.

Persons who travel through a geographic region can use different types of mobile or portable computing platforms to obtain various geographically-related features and services. Mobile or portable computing platforms that provide geographically-related features and services include dedicated computing devices and general purpose computing devices. Dedicated computing devices include in-vehicle navigation systems and personal (i.e., portable or hand-held) navigation systems. General purpose computing devices include devices, such as mobile telephones, portable personal computers (e.g., notebook computers, tablets) and personal digital assistants (e.g., PDAs).

Some of the various geographically-related features and services provided by the different types of mobile or portable computing platforms include route calculation and guidance. For example, some mobile or portable computing platforms are able to provide users with an optimum route to travel by roads between locations in a geographic region. Using input from an end user, and optionally from equipment that can determine the end user's physical location (such as a GPS system), a navigation application program used by a mobile or portable computing platform system examines various paths between two locations to determine an optimum route to travel from a starting location to a destination location in the geographic region. The user of the mobile or portable computing platform is then provided with information about the optimum route in the form of instructions that identify the maneuvers required to be taken by the end user to travel from the starting location to the destination location.

Another geographically-related feature provided by some mobile or portable computing platforms is business or person finding services (e.g., electronic yellow or white pages). These services can identify addresses of individuals or businesses. These services can also identify for a user which businesses of a certain type (e.g., Chinese restaurants) are located within a given range (e.g., 3 miles) of a given location.

Although present mobile or portable computing platforms that provide geographically-related features and services are able to provide many useful advantages, there continues to be room for improvement. One area in which there is room for improvement relates to providing information to end users based upon their location. Some types of information, such as advertising, can be more effective or useful if it is restricted to only certain specific locations. For example, a gas station located in Chicago would not advertise to users located in Miami.

Accordingly, it is an objective to deliver advertising to end users who are traveling in a geographic region. One area in which there is room for improvement relates to creating and providing advertisements to the end user of the mobile or portable computing platforms. It would be beneficial to both the advertiser and the users to provide advertisements that are tailored to the end users and encourage action by the end users.

SUMMARY OF THE INVENTION

To address these and other objectives, the present invention comprises a computer implemented method of providing advertisements to mobile devices located in a geographic region. The method obtains current weather condition information and data representing an advertisement for a point of interest from an advertisement database stored on a computer readable medium. The method determines a size of an advertisement area for the advertisement based on the current weather information. The size of the advertisement area is decreased during a poor weather condition. The advertisement area is a defined portion of the geographic region for location targeting the advertisement for the point of interest. The method obtains a position of a first mobile device, and if the position of the first mobile device is located in the advertisement area, provides an advertisement message for the point of interest to the first mobile device.

According to another aspect, the present invention comprises a system for providing an advertisement. The system comprises a processor, an advertisement database stored on a computer readable medium associated with the processor, and an advertising program executed on the processor. The advertising program obtains weather information or event information and obtains data representing an advertisement associated with a point of interest from the advertisement database. The advertising program determines a size of an advertising area for the advertisement based on the weather information or event information.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Advertising System Overview

Figure 1:
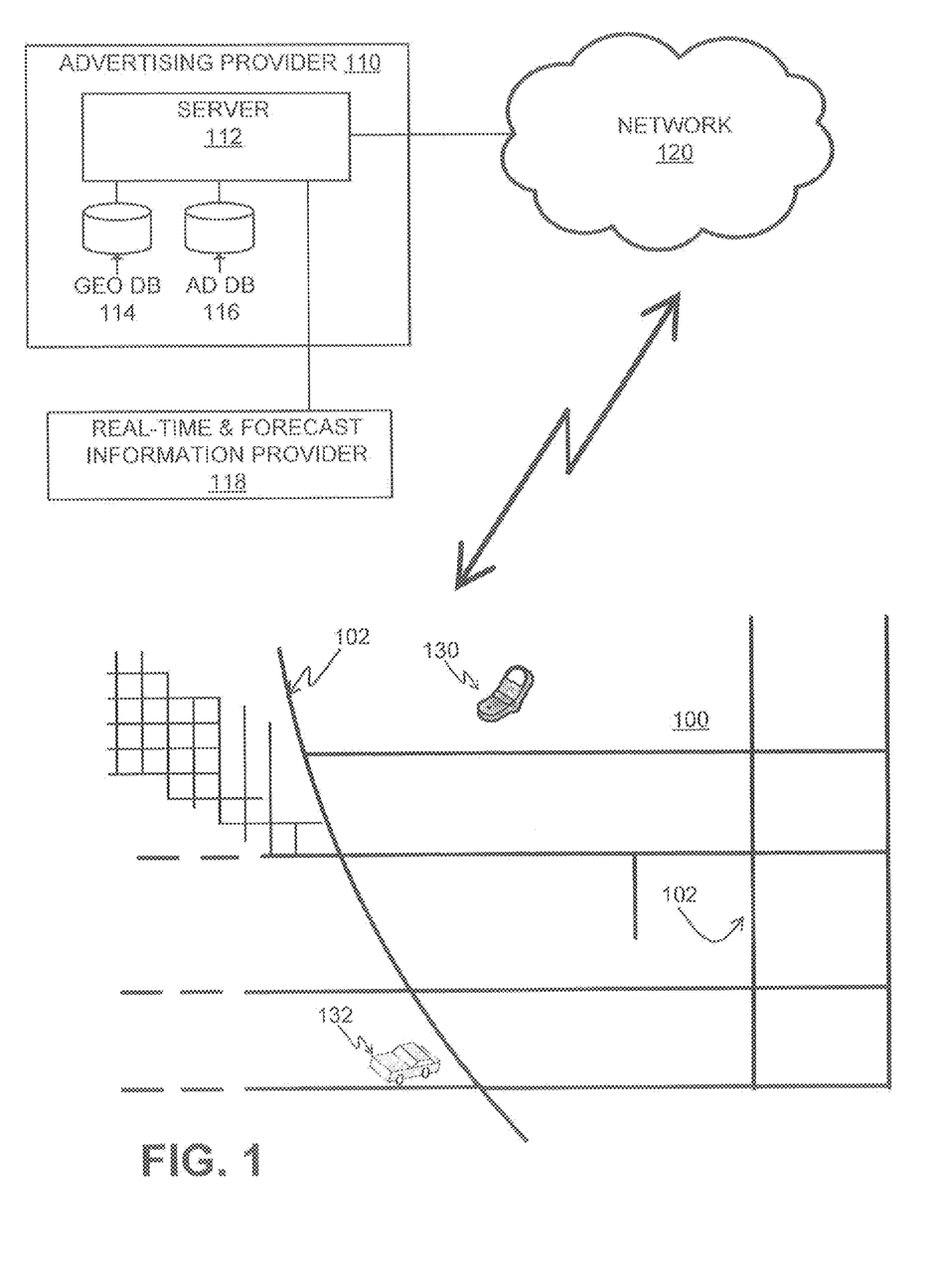
FIG. 1 illustrates an embodiment of a system for providing advertising messages in a geographic region.

FIG. 1 is diagram illustrating a region 100. The region 100 may be a metropolitan area, such as the New York metropolitan area, the Los Angeles metropolitan area, or any other metropolitan area. Alternatively, the region 100 may be a state, province, or country, such as Illinois, France, or Germany. Alternatively, the geographic region 100 can be a combination of one or more metropolitan areas, states, countries, and so on. Located in the region 100 are a road network and a pedestrian network 102. The road network 102 provides a series of connected road segments and intersections; the pedestrian network comprises sidewalks and pedestrian paths. Furthermore, the region 100 includes a public transit network and bicycle path network.

FIG. 1 illustrates an embodiment of a system for providing advertising messages. The system includes an advertising provider 110, a network 120, and a mobile device 130. The mobile device 130 may be a cellular telephone, a mobile phone, a smart phone, a personal digital assistant ("PDA"), a tablet computer, a laptop, a personal navigation device ("PND"), a portable navigation device, a navigation system built into a vehicle and/or any other electronic device. The mobile device 130 may be associated with vehicles 132 that travel on the road network 102 in the region 100. The vehicles 132 may include a variety of cars, trucks, and motorcycles. The mobile device 130 may also be carried by a pedestrian or person traveling on public transit, bicycle or other mode of transportation.

The mobile device 130 includes suitable equipment that enables them to receive the advertising messages sent by the advertising provider 110. The advertising provider 110 transmits data indicating advertisements for points of interests, such as businesses and facilities including retail stores, restaurants, entertainment facilities, and so on, located in the region 100 or for services that are available in the region 100, sometimes referred to as advertising messages or advertisement messages. The mobile devices 130 that receive the advertising messages may include various different computing platforms.

The advertising provider 110 includes at least a server 112, a geographic database 114 and an advertisement database 116. Additionally, the advertising provider 110 receives real-time and forecast information from a real-time and forecast information provider 118. The network 120 and the communication paths between the advertising provider 110 and the network 120 may be any protocol or physical connection that is used to couple a server to a computer. The communication paths may utilize cellular, Ethernet, wireless, transmission control protocol (TCP), internet protocol (IP), or multiprotocol label switching (MPLS) technologies. In addition, the communication paths between the mobile device 130 and the network 120 may utilize cellular technologies including 3G, 4G, or WiMAX. As used herein, the phrases "in communication" and "couple" are defined to mean directly connected to or indirectly connected through one or more intermediate components. Such intermediate components may include both hardware and software based components.

Figure 2:
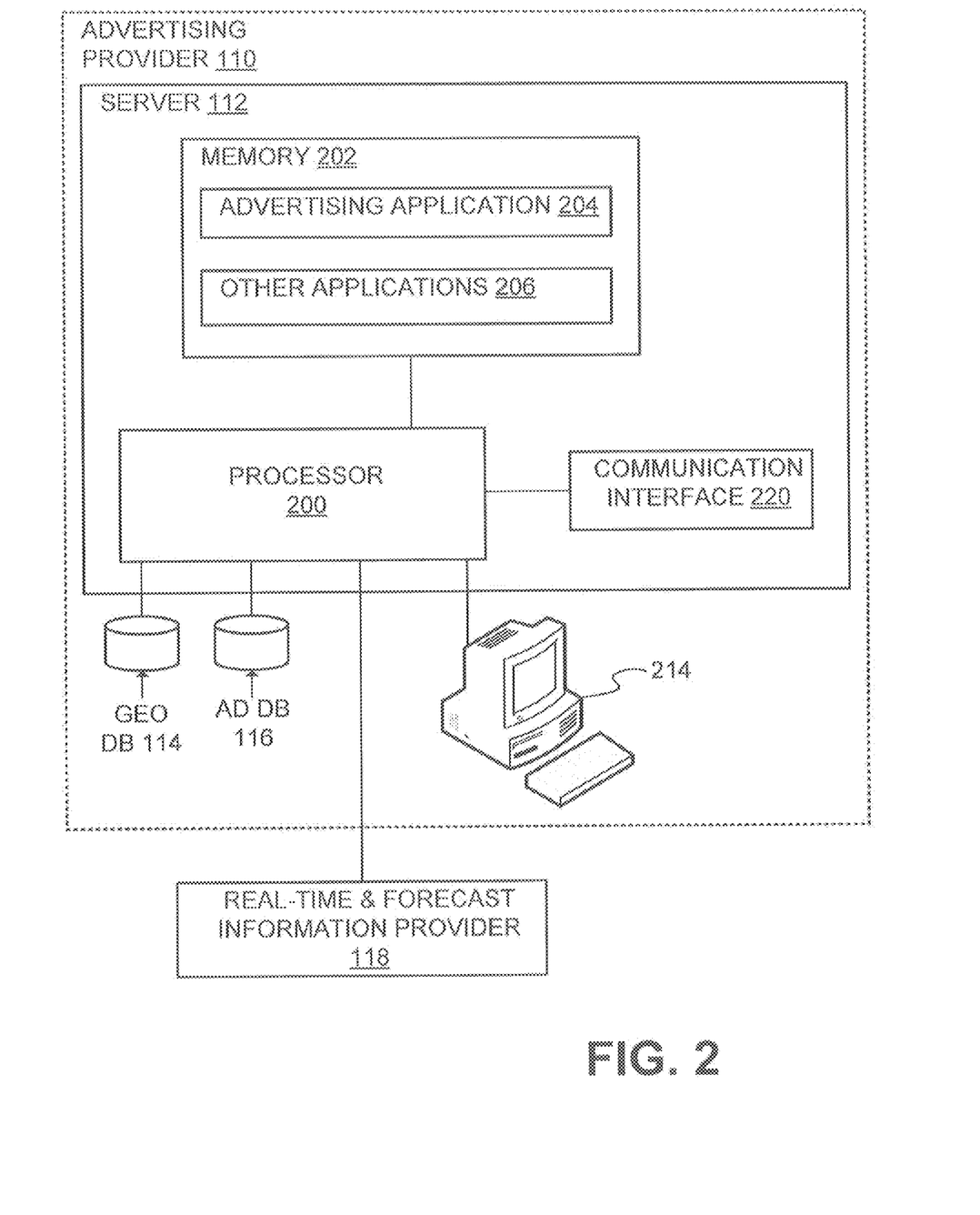
FIG. 2 illustrates a more detailed view of an advertising provider of the system for providing advertising messages in a geographic region.

FIG. 2 illustrates a more detailed view of the advertising provider 110 of the system for providing advertising messages. The advertising provider 110 creates, formats and distributes the advertising messages to a plurality of mobile devices 130. The advertising provider 110 includes equipment and programming for creating, formatting and transmitting the advertising messages. Included among the equipment and programming of the advertising system is an advertising server 112. The advertising server 112 includes appropriate computer hardware and software to run network applications. The advertising server 112 is maintained and operated by the advertising provider 110. The advertising server 112 includes a processor 200, memory 202 and a communication interface 220. Additional, different, or fewer components may be used for the advertising server 112.

Referring to FIG. 2, server applications are included on the advertising server 112. The server applications may be stored on memory comprising one or more hard drive(s) or other computer readable media operated by the server 112 and loaded into a memory 202 of the server 112 to be executed by the processor 200. One of the server applications is an advertising application 204. The advertising application 204 creates, formats and transmits the advertising message to the mobile device 130. The operation of the advertising application will be discussed in detail in conjunction with FIG. 6 below.

Also associated with the advertising server 112 are the geographic database 114 stored on a computer readable medium and the advertisement database 116 stored on a computer readable medium. The geographic database 114 includes geographic data representing a geographic region. The geographic data may include data representing the road network, pedestrian network, public transportation network, bicycle network and points of interest located in the geographic region. The advertisement database 116 includes data representing advertisements and data representing advertising campaigns. The advertisement database 116 is described in detail below in conjunction with FIG. 4. Moreover, the advertising server 112 receives real-time and forecast information, such as real-time and/or forecast weather information, real-time and/or up-coming event information, real-time and/or forecast traffic information, real-time and/or forecast construction information, and so on, from the real-time and forecast information provider 118. The real-time and forecast information may be stored in a computer readable storage medium associated with the server 112.

Referring to FIG. 2, other server applications 206 may be provided. One example of another server application 206 is a navigation-related server application that may include separate applications (or subprograms) that provide these various navigation features and functions. These functions and features may include route calculation (wherein a route to a destination identified by the end-user is determined), route guidance (wherein detailed directions are provided for reaching a desired destination) and other navigation-related or map-related functions and programming, such as map display, positioning (i.e., map matching), local search, destination selection and so on. The advertising application 204 and the other applications 206 may be written in a suitable computer programming language such as C, although other programming languages, such as C++ or Java, are also suitable.

Referring to FIG. 2, the advertising provider 110 also includes a workstation 214. A representative of the advertising provider 110 may use the workstation 214 to establish advertising campaigns and advertising content for the advertisements database 116. Additionally, the representative may be external to the advertising provider 110 and provide advertising campaigns and advertising content.

Figure 3:
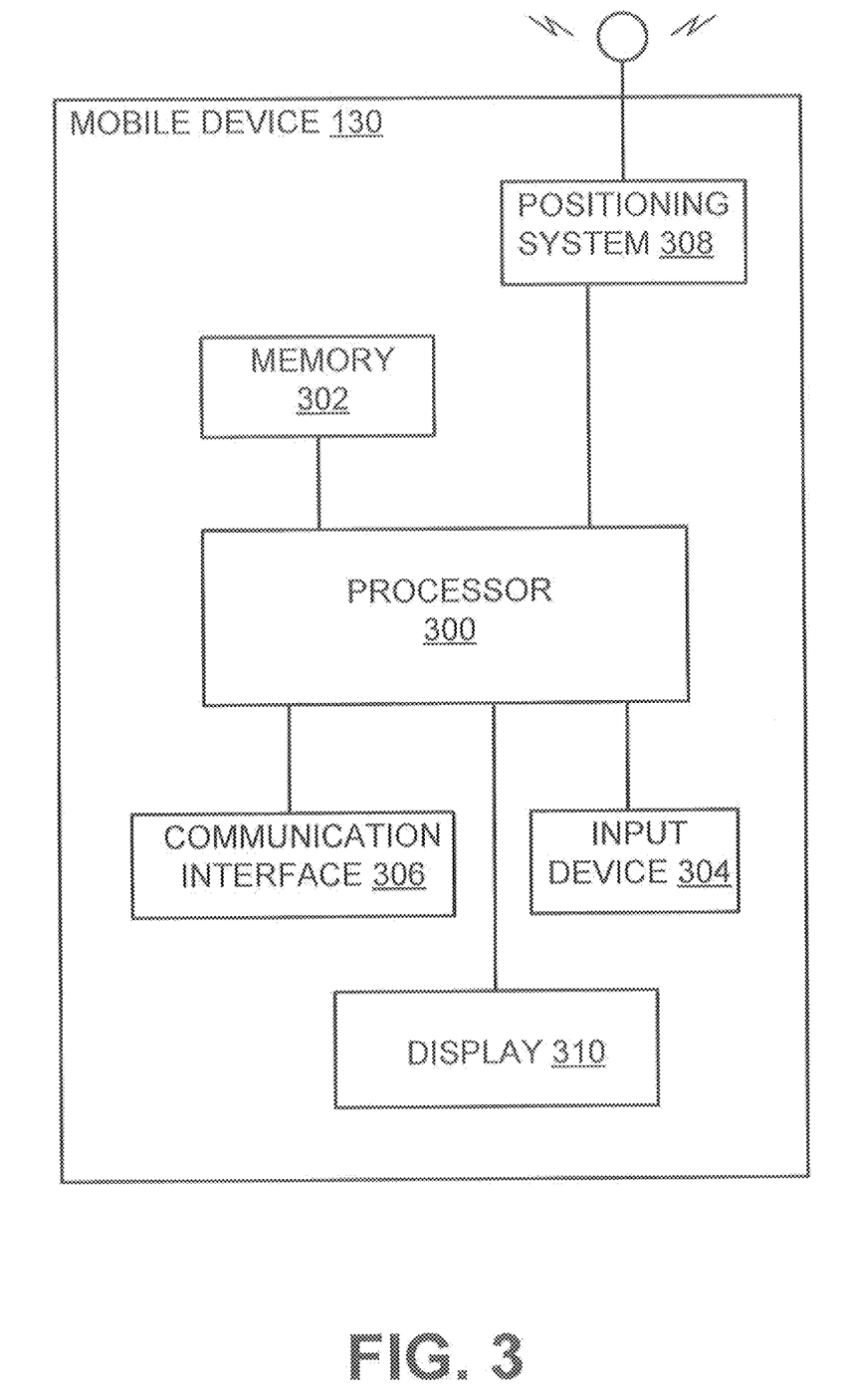
FIG. 3 illustrates a more detailed view of a mobile device of the system for providing advertising messages in a geographic region.

FIG. 3 illustrates a more detailed view of the mobile device 130 of the system for providing advertising messages. The mobile device 130 includes a processor 300, a memory 302, an input device 304, a communication interface 306, a positioning system 308, and a display 310. The processor 300 may be any type of processor suitable for mobile devices and/or computers.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may include an optical, magnetic (hard drive) or any other form of data storage device. The memory 302 may be removable from the mobile device 130, such as a secure digital (SD) memory card.

The input device 304 may be one or more buttons, keypad, keyboard, mouse, stylist pen, trackball, rocker switch, touch pad, voice recognition circuit, or other device or component for inputting data to the mobile device 130. The input device 304 and the display 310 may be combined as a touch screen, which may be capacitive or resistive. The display 310 may be a liquid crystal display (LCD) panel, light emitting diode (LED) screen, thin film transistor screen, or another type of display.

The communication interface 306 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels may be used to create an operable connection. For example, the communication interface 306 may include an output communication interface devoted to sending signals, data, packets, or datagrams and an input communication interface devoted to receiving signals, data, packets, or datagrams. The communication interface 306 provides for wireless and/or wired communications in any now known or later developed format.

The positioning system 308 includes a global positioning system (GPS), cellular, or similar position sensor for providing location data. The positioning system 308 may utilize GPS-type technology, a dead reckoning-type system, or combinations of these or other systems. The positioning system 308 may include suitable sensing devices that measure the traveling distance, speed, direction, and so on, of the device 130. The positioning system 308 may also include appropriate technology to obtain a GPS signal.

In another embodiment, the mobile device 130 may include a geographic database and navigation-related and map-related application software program(s) that provide these various navigation and map features and functions, such as route calculation, route guidance, map display, positioning, local search, destination selection and so on.

II. Geographic and Advertisement Databases

The geographic database 114 includes geographic data representing features located in a geographic region. The geographic data may include data representing the road network 102 including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also represent points of interests (POIs). The POIs may include gasoline stations, hotels, restaurants, museums, stadiums, offices, automobile dealerships, auto repair shops, buildings, stores, statues, monuments, or geographic landmarks. The data representing POIs indicate the location of the POI, including how to access the POI using the road network (or pedestrian network), and various features or attributes of the POI, including hours of operation, telephone number, types of products and services available at the POI, address, and so on. The geographic data may also represent pedestrian features including pedestrian paths, sidewalks, crosswalks, parks, plazas and so on. The geographic data may also represent public transit networks and bicycle networks. The geographic database 114 may be produced and/or maintained by a map developer, such as NAVTEQ North America, LLC located in Chicago, Ill.

Figure 4:
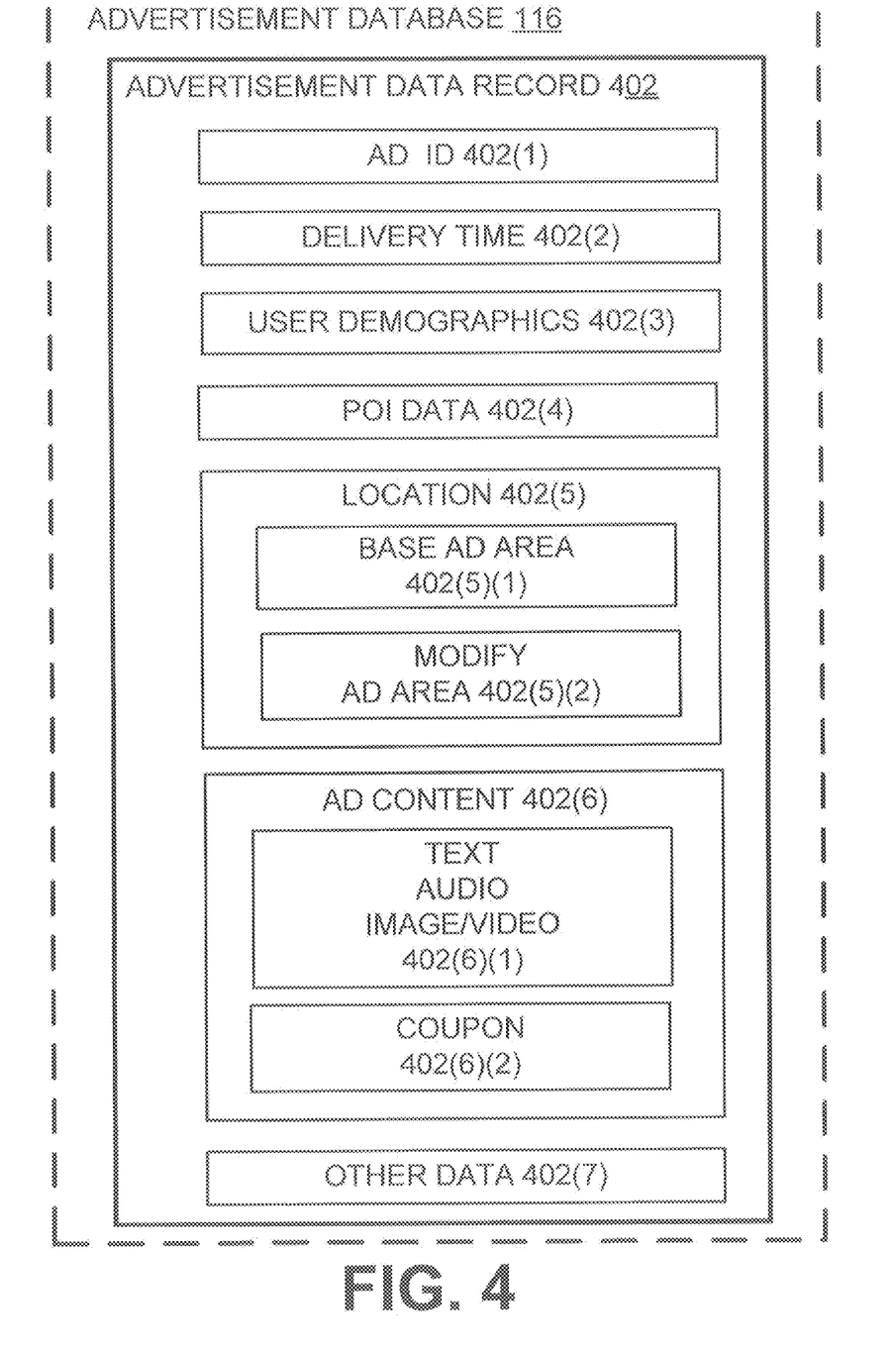
FIG. 4 is a block diagram of an advertisement database.

In order to provide advertising messages, the advertising provider 110 uses the advertisement database 116 that includes data representing advertisements and data representing advertising campaigns. Referring to FIG. 4, the advertisement database 116 contains advertisement data records 402 that represent content and campaign information for the advertisements or advertising messages. The advertisement data 402 includes an advertisement ID 402(1) by which the advertisement data can be identified in the advertisement database 116. Each advertisement content data record 402 has associated with it information that provide information regarding the advertising campaign and the content for the advertisement message.

Referring to FIG. 4, the advertisement data 402 includes data that indicate conditions on the delivery of the advertisement and that provide guidelines and information for the advertising campaign. In one embodiment, the advertisement data 402 provides how the advertisement will be targeted to mobile devices 130. In one embodiment, the advertisement data 402 include data representing delivery time 402(2) or when the advertisement should be delivered, such as time of the day for delivery, between certain hours of the day, on certain days of the week, and so on.

The advertisement data 402 also includes data representing user demographics data 402(3) for targeted recipients for the advertisement. The user demographic data 402(3) indicates what characteristics, such as age, sex, education level, family type, income level and so on, the intended targeted users possess. For example, the demographic data may indicate that the advertisement should be targeted to females between the ages of 30 to 40 years old. Additionally, the demographics data 402(3) may include defined user preferences, defined interests and behavioral patterns.

The advertisement data 402 includes POI data 402(4) that identifies the point of interest associated with the advertisement, such as an ID of a point of interest that identifies the point of interest represented in the geographic database 114. The point of interest associated with the advertisement is typically a business, such as a retail establishment, restaurant, service establishment and so on. The POI data 402(4) provides the location of the point of interest associated with the advertisement, such as an address, latitude and longitude position, or other location reference system. The POI data 402(4) may also provide further information regarding the point of interest, such as business hours, point of interest category, telephone number, website, and other details regarding the point of interest.

The advertisement data 402 includes location data 402(5) representing locations for delivery of the advertisement or where the mobile device is located to be target with the advertisement, such as to any mobile device 130 in the geographic region, to mobile devices located in a defined portion of the geographic region, such as within a region defined by a polygon or a circle centered on a defined point location, and so on. In one embodiment, the advertisement is targeted based on the mobile devices' real time or current locations. In another embodiment, the advertisement is targeted based on the mobile devices' expected future locations or past locations.

The location data 402(5) may specify a geo-fenced area or a defined area called an advertisement area, and the advertisement is to be sent to mobile devices 130 located within the geo-fenced area or advertisement area and not to the mobile devices located outside of the geo-fenced area or advertisement area. In one embodiment, the location data 402(5) provides base advertisement area data 402(5)(1) that defines a portion of the geographic region as the area for location targeting the advertisement. The base advertisement area data provides the geo-fence for location targeting the advertisement when no real-time or forecast information is considered.

Figure 5:
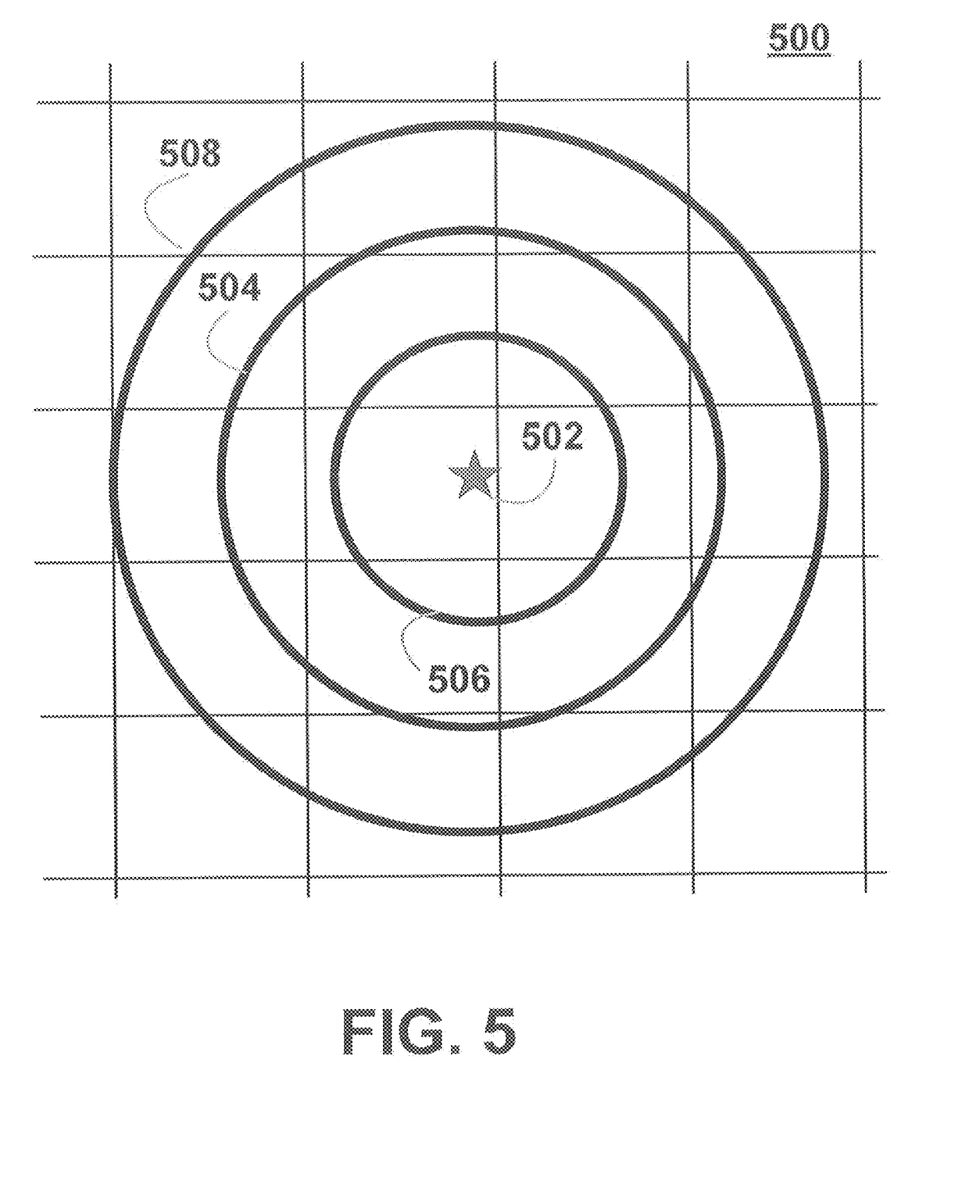
FIG. 5 is a map of a geographic region that depicts several advertisement areas for a point of interest.

FIG. 5 illustrates a map of a geographic region 500 that will be used to illustrate the advertisement area. A point of interest 502 is located in the geographic area 500 and the advertisement for the point of interest 502 has a base advertisement area 504 that defines the boundary or boundaries of the portion of the geographic region for location targeting the advertisement. For example, the point of interest 502 is a coffee shop and its base advertisement area 504 is a circular area having a radius of one half mile centered on the location of the coffee shop 502. The base advertisement area 504 may be defined considering travel distance and or travel time from the boundary of the geo-fence to the location of the point of interest. For example, the typical travel time to walk from the boundary of the base advertisement area 504 to the coffee shop 502 is approximately five minutes.

Referring to FIG. 4, the location data 502(5) includes modify advertisement area data 402(5)(2) using available real-time and/or forecast information. In one embodiment, the modify advertisement area data 402(5)(2) provides data to change the size of the geo-fence or polygon around the point of interest based on real-time or forecast information. The real-time or forecast information may include weather, traffic, construction and event information. Additionally, the real-time information may include time of day, day of week, and season of the year information.

In certain circumstances, it would be beneficial to the advertiser to change the size of the advertisement area to provide a larger advertisement area during certain circumstances and a smaller advertisement area in other circumstances. One example is to modify the size of the advertisement area based on real-time weather conditions. For example, during poor weather conditions, such as a heavy rainstorm or freezing cold temperatures, it would be highly unlikely for customers to walk several blocks to the coffee shop 502. Thus, advertisements targeted to users several blocks away from the coffee shop are wasted during the poor weather conditions. Accordingly, the modify advertisement area data 402(5)(2) specifies a different advertisement area size than the base advertisement area size during specified different weather conditions. In one embodiment, the modify advertisement area data 402(5)(2) provides a smaller radius for the geo-fence for predefined poor weather conditions, such as during rain and snow or temperature above ninety-five degrees Fahrenheit and below 30 degrees Fahrenheit.

FIG. 5 illustrates the smaller advertisement area 506 that is half the size of the base advertisement area 504 for use during inclement weather. The coffee shop 502 would benefit from increasing the size of its advertisement area because customers are more likely to walk farther for a coffee during pleasant weather, such as the advertisement area 508 that is larger than the base advertisement area 504. In one embodiment, the modify advertisement area data 402(5)(2) provides a table with predefined weather conditions and corresponding radius size. In another embodiment, the modify advertisement area data 402(5)(2) provides a model for the radius size give weather conditions, such as an equation that provides the radius size as a function of current weather conditions and/or forecast weather conditions.

In addition to weather, other types of information may be considered to modify the size of the geo-fence or advertisement area. Event information may be used by advertisers to capture potential customers by modifying the size and location of the advertisement area. For example, during game day many parking garages close to a stadium are full, so during these times parking garages located several blocks away from the stadium should increase the size of their respective advertisement areas and focus the location of their respective advertisement areas to locations surrounding the stadium to capture potential customers going to the event. In this case, the advertisement area or geo-fence is not circular, but would have a shape that captured both the area around the parking garage as well as the area around the stadium. By allowing modifications to the size and location of the advertisement areas based real-time or forecast information, advertisers would increase the likelihood that their advertisements would induce the desired behavior and reduce the likelihood that the advertisements are wasted without inducing the desired consumer behavior.

In addition to weather and events, other types of information may be considered to modify the size of the geo-fence or advertisement area. Real-time, forecast and historic traffic information may be used to modify the size of the advertisement area. For example, if traffic information indicates heavy congestion and traffic jams on the roads in the area around the point of interest associated with the advertisement, the advertisement area is reduced in size because consumers typically do not wish to sit in traffic to visit the point of interest. Similarly, construction information may be used to modify the size of the advertisement area. For example, if road construction information indicates lane closures on the road that provides access to the point of interest associated with the advertisement, the advertisement area is reduced in size because consumers typically do not wish to pass through construction sites to visit the point of interest. Moreover, time of day, day of week, and season of the year information may be used to modify the size of the advertisement area. For example, the size of the advertisement area for an ice cream shop may be larger during summer than winter. Additionally, the size of the advertisement area for a coffee shop may be larger during the day time than night time.

Referring to FIG. 4, the advertisement data 402 also includes data representing content 402(6) for the advertising message, such as text, audio, images and video. In one embodiment, the advertisement database 116 includes more than a single advertisement content for each advertisement message. In another embodiment, the advertisement database 116 includes more than one version of advertisement content for the advertising message for a single point of interest or service. Referring to FIG. 4, the content 402(6)(1) comprises text, audio, images and/or video and the content also includes a coupon 402(6)(2) or other incentive to encourage the advertising recipient(s) to visit the associated point of interest or request the associated service.

The advertisement data 402 includes other data 402(7). Other data 502(7) may indicate key words that would trigger the advertising message, such as a user requesting a restaurant. Additionally, the other data 402(7) may include pricing information for the advertisement.

III. Advertisement Area Size Using Real-Time and Forecast Information

As discussed above in conjunction with FIG. 2, the advertising provider 110 includes the advertising program 204 that provides advertisement messages for various mobile devices 130. In one embodiment, the advertising program 204 provides location based advertisements to mobile devices 130 by modifying the size and location of the advertisement area based on real-time and/or forecast information, such as events and weather conditions.

Figure 6:
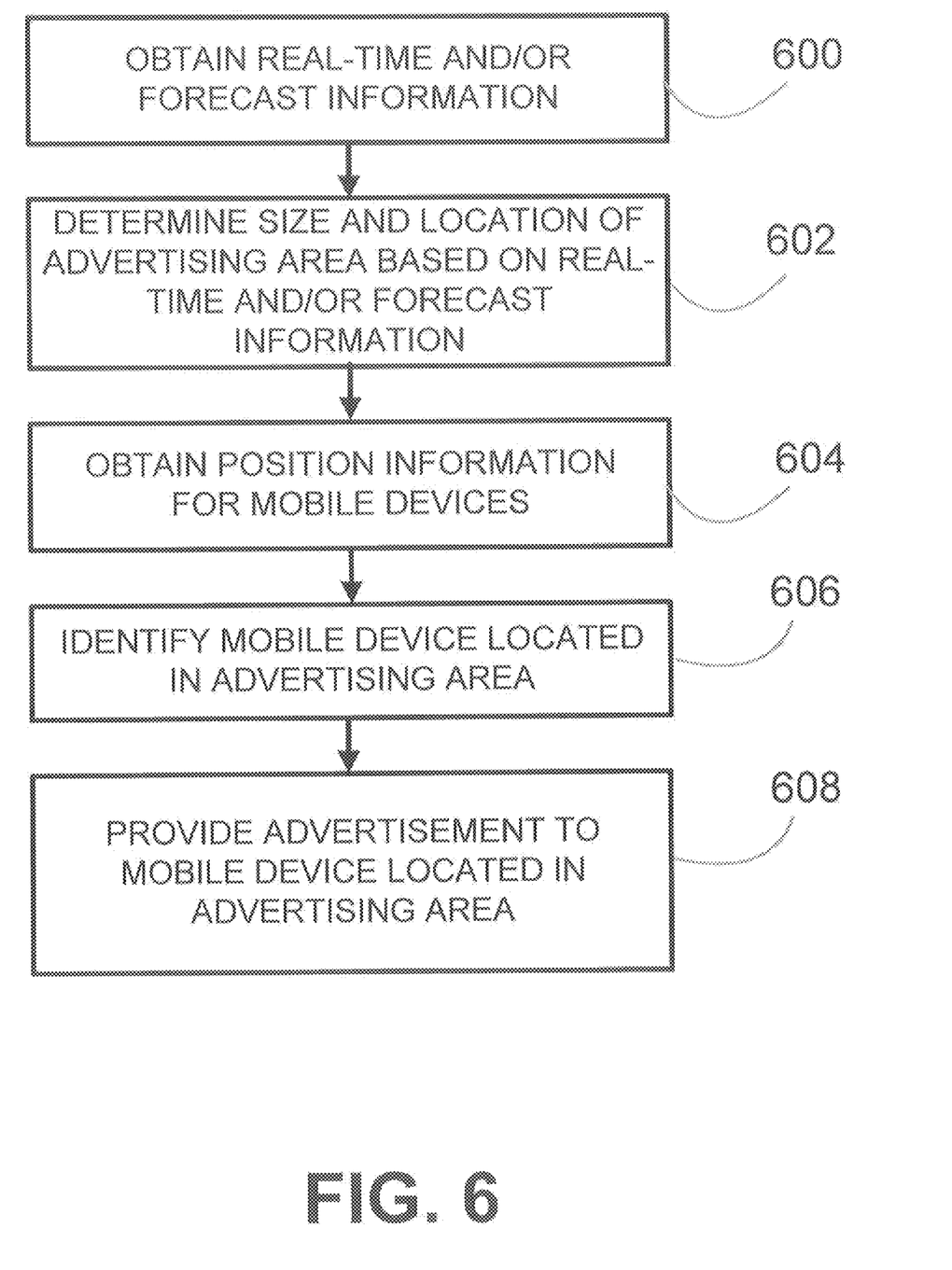
FIG. 6 is a flow chart for providing advertising messages.
Figure 7:
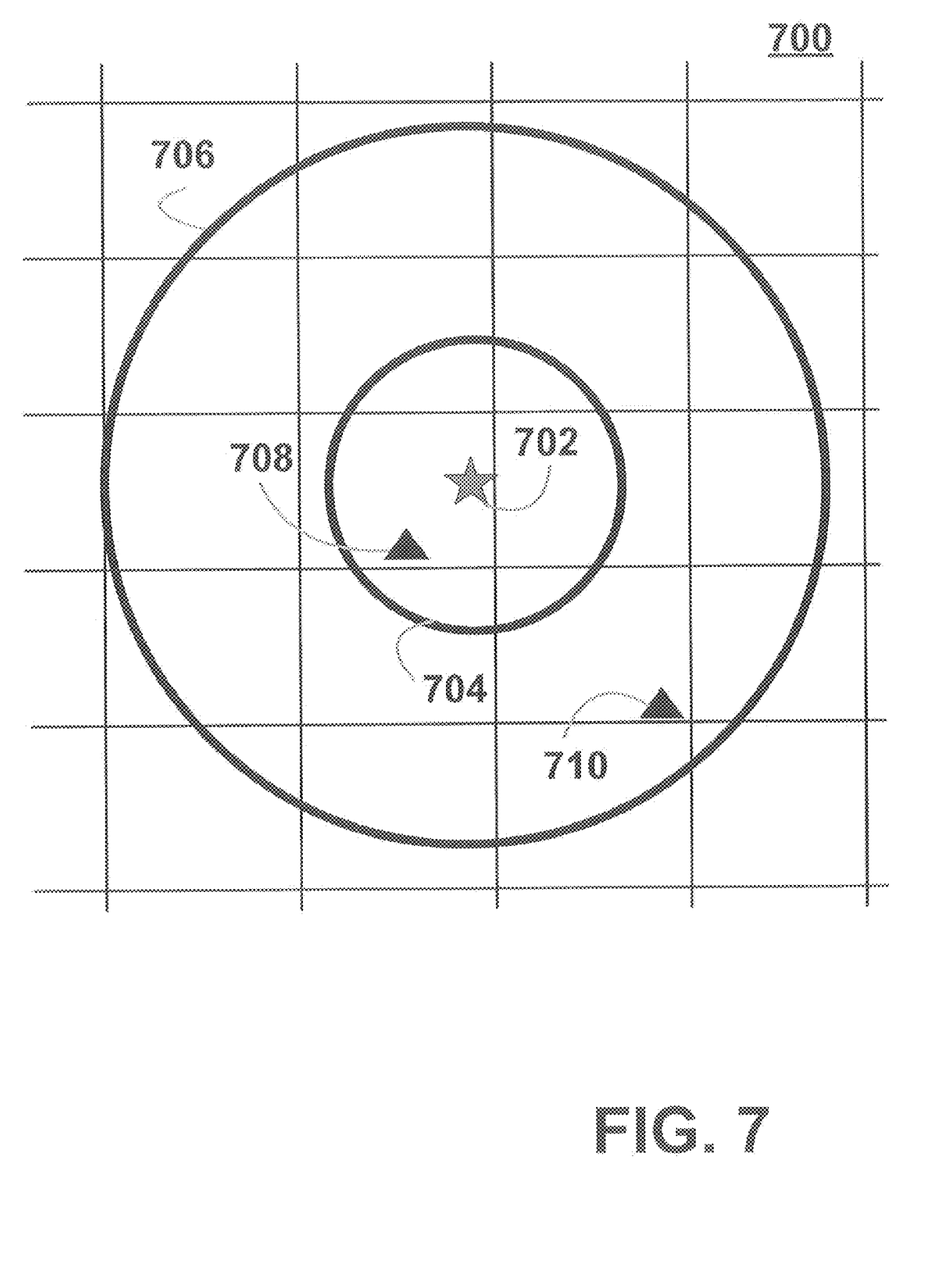
FIG. 7 illustrates a map of a geographic region that depicts the location of two mobile devices and advertisement areas, according to an example embodiment.

FIG. 6 illustrates a flow chart of the steps for providing a location based advertisement using modified advertisement areas according to an example embodiment. FIG. 7 illustrates a map of a geographic region 700 that will be used to illustrate the steps discussed in conjunction with FIG. 6.

At step 600, the advertising program 204 obtains real-time and/or forecast information from the real-time and forecast information provider 118. In one embodiment, when needed by the advertising program 204, the server 112 requests specific real-time and/or forecast information for specified locations and obtains the information from the real-time and forecast information provider 118 via a communication connection. In another embodiment, the server 112 periodically obtains the real-time and/or forecast information from the real-time and forecast information provider 118 via a communication connection. For example, the server 112 obtains the current weather conditions for different locations in the geographic region, such as current temperature, current precipitation, current sky condition, current wind speed and so on, every five minutes. Referring to FIG. 7, the server 112 obtains the current weather conditions for the portion of the geographic region 700 depicted on the map as rainy, temperature of forty-three degrees Fahrenheit with strong wind gusts. In another embodiment, the server 112 obtains the forecast weather conditions several times a day. For example, at 9 am the server 112 obtains the forecast temperature, forecast chance of precipitation, forecast sky conditions and so on for set time periods of 9 am, noon, 3 pm, 6 pm, 9 pm and so on.

In one embodiment, the server 112 obtains the current event information for different locations and venues in the geographic region 700 at regular time intervals. For example, the current event information indicates that a stadium has a baseball game in the seventh inning with attendance of 23,000 people. In another embodiment, the server 112 obtains the information on upcoming events once or several times a day. For example, the server 112 obtains daily information regarding events for that day including location of the event, type of event, number of expected attendees, start and end time of the event and so on. In yet another embodiment, the server 112 requests specific real-time information regarding a specified venue when needed by the advertising program 204.

Referring to FIG. 6, at step 602 the advertising program 204 determines the size and/or location of an advertisement area based on the real-time and/or forecast information. In one embodiment, the advertising program 204 obtains location data 402(4) for an advertisement from the advertisement database 116. The location data 402(4) may contain data indicating the appropriate size and location for the advertisement area of the advertisement. In one embodiment, the advertising program 204 obtains the base advertisement area data 402(5)(1) that identifies the size and location of the advertisement area. In another embodiment, the advertising program 204 obtains modify advertisement area data 402(5)(2) that indicates the size and/or location of the advertisement area given the real-time and/or forecast information obtained in step 600. For example, the current weather condition information obtained in step 600 indicates strong rain. The modify advertisement area data 402(5)(2) for an advertisement associated with a café 702 of FIG. 7 provides that when the current weather is rain, the advertisement area 704 is a circular area with a radius of one quarter mile. Accordingly, the advertising program 204 using the modify advertisement area data 402(5)(2) for the café 702 and the current weather condition of rain determines that the advertisement area 704 is a circular area centered on the location of the café with a radius of one quarter mile.

For another example, the current weather condition information obtained in step 600 indicates sun with a temperature of 75 degrees Fahrenheit. The modify advertisement area data 402(5)(2) for an advertisement associated with a café 702 of FIG. 7 provides that when the current weather is no rain and current temperature between 65 and 80 degrees Fahrenheit, the advertisement area 706 is a circular area with a radius of one mile. Accordingly, the advertising program 204 using the modify advertisement area data 402(5)(2) for the café 702 and the current weather condition of sun and 75 degrees Fahrenheit determines that the advertisement area 706 is a circular area centered on the location of the café 702 with a radius of one mile.

Referring to FIG. 6, at step 604, the advertising program 204 obtains position information for mobile devices 130. The positioning system 308 determines the location, direction, orientation and/or speed of the mobile device 702. In another embodiment, the server 112 may obtain the position information for the mobile device by triangulation or other cellular phone positioning method. The current position may be provided to the server 112 in terms of latitude and longitude coordinates. In one embodiment, the mobile device 130 runs an application that requests an advertisement from the server 112 and includes an identification of the mobile device 130 as well as the current position information and/or demographics, interest and preference information with the request to the server 112. Using the current position information, the advertising program 204 may identify on which road segment or pedestrian segment that the mobile device 130 is currently traveling on by map matching.

In another embodiment, the position information of the mobile device 130 is a likely future position. For example, the advertising program 204 obtains position information indicating travel plans to another city on a future date, and the destination of the travel plans is used as the position of the mobile device 130. In a further embodiment, the position may be determined by analyzing historic position data. The position data for the mobile device from many weeks may be analyzed to determine a pattern of travel and locations regularly visited. For example, by analyzing past position data, the advertising program may determine that the mobile device visits neighborhood X every Thursday from 7 pm to 10 pm.

At step 606, the advertising program 204 identifies whether the mobile device is located in the advertisement area. In one embodiment, the position information of the mobile device is compared to the size and position of the advertisement. For the example shown in FIG. 7 with current weather of rain, the distance from the position of the mobile device 708 to the location of the café 702 is determined and this distance is compared to the radius of the advertising zone 704 to identify that the mobile device 708 located within the advertisement area 704. The distance from the position of the mobile device 710 to the location of the café 702 is determined and this distance is compared to the radius of the advertising zone 704 to identify that the mobile device 708 located outside the advertisement area 704.

For the example shown in FIG. 7 with current weather of sunny and temperature of 75 degrees Fahrenheit, the distance from the position of the mobile device 708 to the location of the café 702 is determined and this distance is compared to the radius of the advertising zone 706 to identify that the mobile device 708 located within the advertisement area 706. The distance from the position of the mobile device 710 to the location of the café 702 is determined and this distance is compared to the radius of the advertising zone 706 to identify that the mobile device 708 is also located within the advertisement area 706.

Referring to FIG. 6, at step 608, the advertising program 204 provides the advertisement to the mobile device(s) located in the advertisement area. For the example shown in FIG. 7 with current weather of rain, the advertising program 204 provides the advertisement to the mobile device 708 and does not provide the advertisement to the mobile device 710. For the example shown in FIG. 7 with current weather of sunny and temperature of 75 degrees Fahrenheit, the advertising program 204 provides the advertisement to the mobile devices 708 and 710.

If the advertising content includes a coupon, the advertisement message provided to the mobile devices includes the coupon. The advertising program 204 creates the advertisement message using the advertising content data 402(6) for the advertisement data record having its respective advertisement area. The advertisement message is transmitted to the mobile device 130 from the server 112 over the network 140. Once the mobile device 708, 710 receives the advertisement message, the advertisement message is provided to the user via the display 310 and/or other user interface of the mobile device. In one embodiment, the advertisement message is stored in memory 302 of the mobile device, and an application running on the mobile device 130 provides the advertisement to the end user of the mobile device. The end user views and interacts with the advertisement message via the display and user interface of the mobile device. For example, the end user may click to a landing page associated with the advertisement message, click to the coupon provided by the advertisement message, click to obtain a map displaying the point of interest associated with the advertisement message, click to call the point of interest associated with the advertisement message, click for directions to the point of interest associated with the advertisement message and/or click to obtain a website of the point of interest associated with the advertisement message. The messages communicating the users' response to the advertisement are provided to the mobile devices and provided to the user via the display 310 and/or other user interface of the mobile device 130. In one embodiment, the mobile device 130 may request additional information from the server 112, such as directions to the point of interest. Additionally, the server 112 may track the position of the mobile devices to determine that the devices visit the point of interest and or redeem the offer of the advertisement message. Moreover, the advertising program 204 tracks the user response to the advertisements as well as whether the incentive or coupon is redeemed.

In alternative embodiments, the steps shown in FIG. 6 may be performed in a different order by the advertising program 204. In another embodiment, the position of the mobile device is obtained and then an advertisement having an advertisement area that encompasses the position of the mobile device is identified.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer implemented method of providing advertisements to mobile devices located in a geographic region, the method comprising:
   obtaining current weather condition information;
   obtaining data representing an advertisement for a point of interest from an advertisement database stored on a computer readable medium;
   determining, using a processor, a dimension for an advertisement area for the advertisement based on the current weather information, wherein the dimension of the advertisement area is decreased during a poor weather condition, wherein the advertisement area is a defined portion of the geographic region for location targeting the advertisement for the point of interest;
   obtaining a position of a first mobile device; and
   providing an advertisement message for the point of interest to the first mobile device if the position of the first mobile device is located in the advertisement area.

2. The method of claim 1 wherein the dimension of the advertisement area is increased during a good weather condition.

3. The method of claim 1 wherein the current weather information is real-time weather information.

4. The method of claim 1 wherein the current weather information is forecast weather information.

5. The method of claim 1 further comprising:
   obtaining a position of a second mobile device; and
   not providing the advertisement message to the second mobile device if the position of the second mobile device is located outside the advertisement area.

6. The method of claim 1 further comprising:
   obtaining event information; and
   determining a size of the advertisement area based on the current event information.

7. The method of claim 1 further comprising:
   obtaining traffic information or construction information or time information; and
   determining a size of the advertisement area based on the traffic information or the construction information or the time information.

8. The method of claim 1, wherein the dimension for the advertisement area is a radius selected based on a travel time.

9. The method of claim 8, wherein the travel time is an estimated amount of time a customer is willing to travel in the poor weather condition.

10. The method of claim 1, wherein the poor weather condition exists when an environmental temperature is outside of a predetermined temperature range.

11. A computer implemented method of providing advertisements to mobile devices, the method comprising:
    obtaining real-time information at a processor, wherein the information includes at least one type of information selected from the group consisting of weather information, event information, time information, traffic information and road construction information;
    determining, by the processor, a size of an advertising area for an advertisement based on the real-time information, wherein the advertising area is a defined portion of a geographic region for location targeting the advertisement; and
    providing the advertisement to a first mobile device if a position of the first mobile device is located in the advertising area.

12. The method of claim 11 wherein the size of the advertising area is increased during a good weather condition.

13. The method of claim 11 wherein the size of the advertising area is increased during an event.

14. The method of claim 11 wherein the size of the advertising area is decreased during a poor traffic condition or during a road construction event.

15. The method of claim 11, wherein determining, by the processor, the size of an advertising area comprises determining a radius of a polygon or a circle that defines the advertising area.

* * * * *